United States Patent
Wulff

(10) Patent No.: US 7,967,321 B2
(45) Date of Patent: Jun. 28, 2011

(54) ROLL COUPLING TRAILER HITCH ASSEMBLY

(76) Inventor: Lawrence H. Wulff, Vernon (CA)

( * ) Notice: Subject to any disclaimer, the term of this patent is extended or adjusted under 35 U.S.C. 154(b) by 244 days.

(21) Appl. No.: 12/216,981

(22) Filed: Jul. 14, 2008

(65) Prior Publication Data

US 2009/0014982 A1    Jan. 15, 2009

Related U.S. Application Data

(60) Provisional application No. 60/949,868, filed on Jul. 15, 2007, provisional application No. 60/988,879, filed on Nov. 19, 2007, provisional application No. 60/991,743, filed on Dec. 2, 2007, provisional application No. 60/991,984, filed on Dec. 3, 2007, provisional application No. 60/992,220, filed on Dec. 4, 2007, provisional application No. 61/031,006, filed on Feb. 24, 2008.

(30) Foreign Application Priority Data

Nov. 16, 2007 (CA) .................................... 2611395

(51) Int. Cl.
*B60D 1/14* (2006.01)
(52) U.S. Cl. ............... 280/456.1; 280/477; 280/504; 280/515
(58) Field of Classification Search ........... 280/456.1, 280/477, 504, 515
See application file for complete search history.

(56) References Cited

U.S. PATENT DOCUMENTS

| | | | | |
|---|---|---|---|---|
| 774,903 A * | 11/1904 | Ammann | | 280/508 |
| 776,292 A * | 11/1904 | Buller | | 280/486 |
| 788,692 A * | 5/1905 | Ammann | | 280/509 |
| 1,233,849 A * | 7/1917 | Culhane | | 280/509 |
| 1,524,503 A | 1/1925 | Bennett et al. | | |
| 1,552,620 A | 9/1925 | Knox | | |
| 1,643,885 A | 9/1927 | Gill | | |
| 1,957,917 A | 5/1934 | Storey | | |
| 2,251,656 A | 8/1941 | Botelho | | |
| 2,360,902 A | 10/1944 | Simmons | | |
| 2,460,466 A | 2/1949 | Nogle | | |
| 2,491,373 A * | 12/1949 | Goff | | 280/508 |
| 2,591,916 A * | 4/1952 | Leslie | | 280/504 |
| 2,673,096 A * | 3/1954 | Bendtsen | | 280/504 |
| 3,052,487 A * | 9/1962 | Harbers et al. | | 280/506 |
| 3,298,706 A | 1/1967 | Lyall | | |
| 4,962,945 A * | 10/1990 | Vannoy et al. | | 280/508 |
| 5,183,284 A * | 2/1993 | Paplinski | | 280/508 |
| 5,244,047 A * | 9/1993 | Eudy | | 172/275 |
| 5,967,541 A * | 10/1999 | Johansen | | 280/504 |
| 6,047,982 A * | 4/2000 | McClure et al. | | 280/515 |
| 6,139,043 A * | 10/2000 | Gries et al. | | 280/504 |
| 6,764,092 B1 * | 7/2004 | Greaves, Jr. | | 280/494 |
| 6,908,093 B1 * | 6/2005 | Putnam | | 280/435 |

* cited by examiner

*Primary Examiner* — Joanne Silbermann
*Assistant Examiner* — Michael R Stabley
(74) *Attorney, Agent, or Firm* — Antony C. Edwards

(57) ABSTRACT

A roll coupling assembly includes a roll torque transfer structure and an alignment mechanism. The torque transfer structure includes a first load bearing structure mountable to the rear of the tow vehicle, and a second load bearing structure mountable to the front of the trailer drawbar. Corresponding first and second load bearing surfaces cooperate so as to releasably mate with one another for towing of the trailer behind the tow vehicle. The bearing surfaces are distributed across a substantially planar interface between the rear of the tow vehicle and the front of the trailer drawbar so as to distribute to the tow vehicle torque imparted to the drawbar by relative rolling motion between the trailer and tow vehicle. The coupling alignment mechanism adjusts the relative orientation of the first and second load bearing surfaces so as to align them for mating to one another.

18 Claims, 16 Drawing Sheets

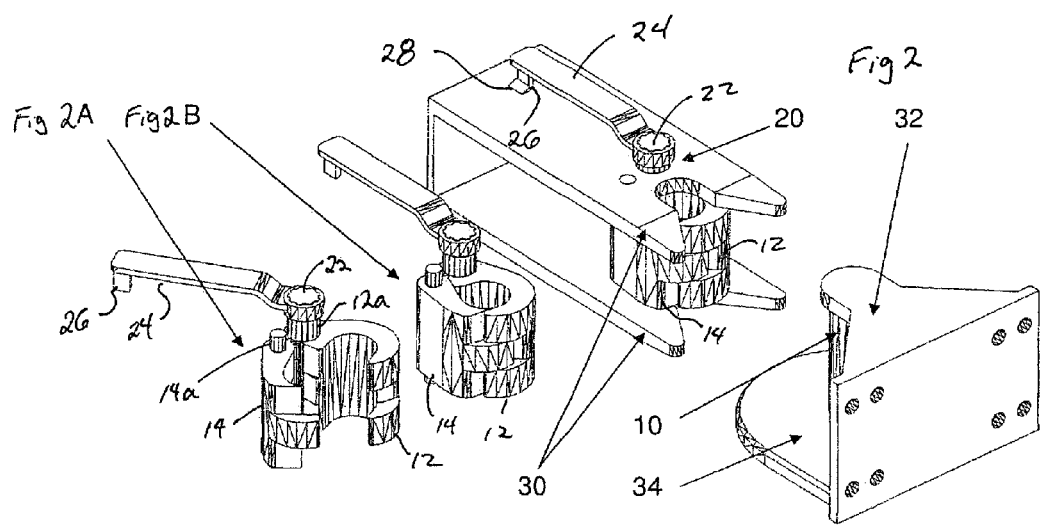
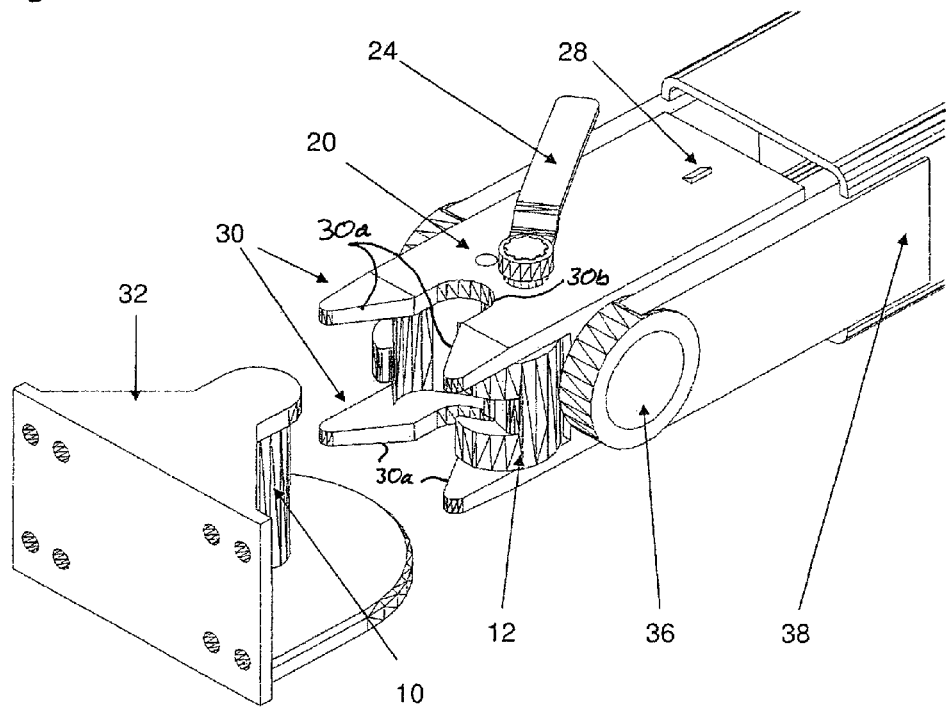

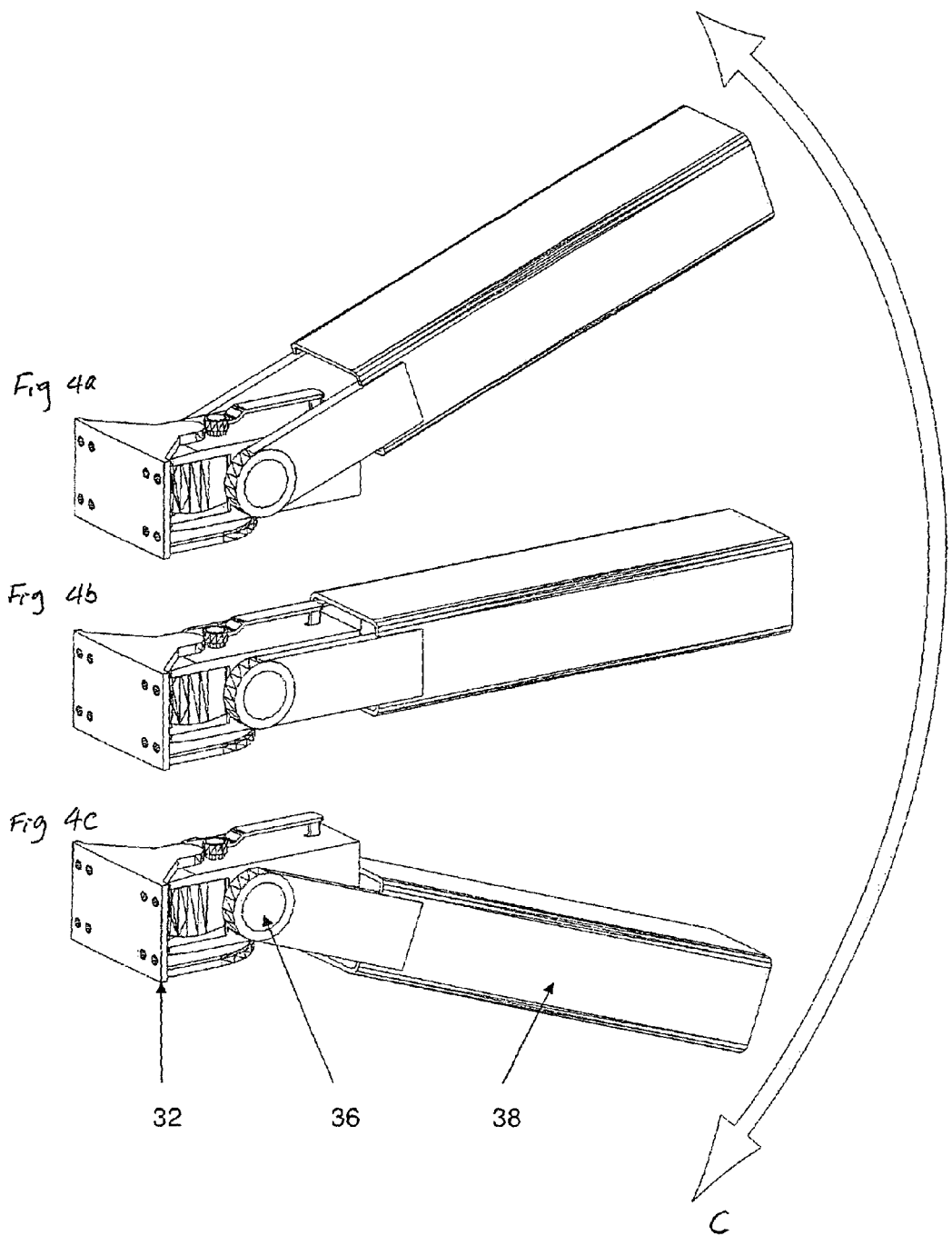

ROLL COUPLING TRAILER HITCH ASSEMBLY

CROSS REFERENCE TO RELATED APPLICATION

This application claims priority from U.S. Provisional Patent Application Nos.:
60/949,868 filed Jul. 15, 2007 entitled Multiple Hitch Assembly,
60/988,879 filed Nov. 19, 2007 entitled Multiple Hitch Assembly,
60/991,743 filed Dec. 2, 2007 entitled Multiple Hitch Assembly,
60/991,984 filed Dec. 3, 2007 entitled Multiple Hitch Assembly,
60/992,220 filed Dec. 4, 2007 entitled Modified "A" Dolly
61/031,006 filed Feb. 24, 2008 entitled Roll Coupling Device
and Canadian Application number:
2,611,395 filed Nov. 16, 2007 entitled Multiple Hitch Assembly

FIELD OF THE INVENTION

The present invention relates to devices for connecting a trailer to the rear of a tow vehicle so as to roll couple the trailer to the tow vehicle to improve vehicle stability.

BACKGROUND OF THE INVENTION

In the prior art applicant is aware of U.S. Pat. No. 1,524,503, which issued Jan. 27, 1925 to Bennett et al for Trailer Coupling, U.S. Pat. No. 1,552,620, which issued Sep. 8, 1925 to Knox for Trailer Coupling, U.S. Pat. No. 2,460,466, which issued Feb. 1, 1949 to Nogle for Trailer Dolly, U.S. Pat. No. 2,360,902, which issued Oct. 24, 1944 to Simmons for Vehicle, U.S. Pat. No. 1,957,917, which issued May 8, 1934 to Storey for Tractor, U.S. Pat. No. 3,298,706, which issued Jan. 17, 1967 to Lyall for Heavy Motor Vehicles and Equipment, U.S. Pat. No. 1,643,885, which issued Sep. 27, 1927 to Gill for Means for Loading and Hauling Automobiles.

Knox and Bennett describe trailer coupling assemblies using two vertically aligned hitch points for the purpose of automatically elevating a trailer while connecting the trailer to the tow vehicle in order to transfer trailer weight to the rear axle of the tow vehicle.

Nogle discloses a wheeled dolly having two horizontally aligned connecting points to carry the weight of the front of a trailer towed behind the dolly.

Simmons describes providing one or more connection points for the purposes of selectively transferring weight from one portion of the vehicle to another and to change the angular alignment of the interconnected vehicles.

Storey discloses providing articulation to interconnect two parts of a vehicle. Applicant is aware that in the prior art it is known to provide booster axles designed to be attached to the front or rear of vehicles for the purpose of transferring weight from the vehicles to the booster axles to increase the carrying capacity of the vehicles.

By way of example, Lyall describes an articulating booster axle designed to transfer part of a crane's weight to a booster axle that trails or tracks behind the crane.

Gill teaches an automobile carrier with a hitch assembly located aft of the truck frame.

As commercial vehicles increase load capacity by increasing the number of weight bearing axles over a given length, the vehicle's centre of gravity is raised and the vehicle becomes increasingly unstable while in motion. In applicant's experience, the governing governmental authorities have started to restrict weights on combination vehicles where the trailers are attached to the rear of tow vehicles (including dump truck and pony trailer combinations, or other truck and trailer combinations, or combinations where a trailer is towed by another trailer) in order to reduce the number of accidents involving these vehicles.

In applicant's experience, at least with respect to truck and trailer combinations, roll coupling these types of vehicle combinations may improve safety and provide an alternative to reducing weight limits by the governing authorities. To the knowledge of applicant, tridem (that is, three axle) pony trailers are presently limited to 21,000 kgs on the trailer axles in British Columbia, Canada. The previous maximum weight for a tridem axle group in British Columbia was 24,000 kgs.

The present invention may provide improvised yaw and roll stability using roll coupling between the tow vehicle and towed trailer when used in conjunction with sufficiently torsionally strong draw bars and corresponding supporting framework on the trailer to resist twisting during initial rolling motion of the trailer and so as to import the resulting torque to the roll coupling and thence to the tow vehicle. The present invention is also to be used in conjunction with legal hitch offset distances for trucks pulling trailers that are attached to the rear of the truck frame and trailers that are attached to the rear of another trailer frame while maintaining steering tire traction. The invention uses a single roll coupling hitch or a plurality of diagonal, horizontal or vertically aligned hitch assemblies as required for different applications to provide roll coupling and so as to allow offset distances, and so as to provide redundant critical hitch components and so as to reduce operating stresses on individual hitch components. Using common hitch components whenever possible also enables the tow vehicle to be used with trailers equipped with pintle couplers, that is, which are not equipped with roll couplers.

This document will serve to illustrate different devices using, and methods using, one or more hitch assemblies to accomplish roll coupling when attaching a trailer to the rear of a tow vehicle frame. It must again be stated that in using the present invention trailers must be engineered to withstand the torsional stresses that will be introduced with roll coupling hitch assemblies.

A dynamic analysis was conducted to simulate the performance of the present invention utilizing the University of Michigan Transportation Institute (UMTRI) yaw/roll model for a tandem truck/tridem pony trailer for the following four conditions: Loaded truck (GVW 26 100 kg), loaded trailer (GVW 21 000 kg)—no roll-coupling; Empty truck (GVW 13 695 kg), loaded trailer (GVW 21 000 kg)—no roll-coupling; Loaded truck (GVW 26 100 kg), loaded trailer (GVW 24 000 kg)—roll-coupling; and, Empty truck (GVW 13 695 kg), loaded trailer (GVW 24 000 kg)—roll-coupling.

The truck trailer dimensions are summarized in Table 1. Loads were placed on the truck and trailer so that the maximum axle group loads were achieved at maximum legal height (4.15 m).

TABLE 1

Summary of truck/trailer dimensions

| Parameter | Dimension (m) |
| --- | --- |
| Truck | |
| Wheelbase | 6.109 |
| Drive group spread | 1.397 |
| Hitch offset | 1.448 |
| Hitch height | 0.591 |

TABLE 1-continued

Summary of truck/trailer dimensions

| Parameter | Dimension (m) |
|---|---|
| Trailer | |
| Wheelbase | 6.464 |
| Trailer group spread | 2.769 |
| Deck height | 0.864 |

The following performance measures were evaluated for each load condition. The performance measures are described below. Handling performance—oversteer transition (H-P1); Handling performance—understeer coefficient at 0.3 g (H-P2); Handling performance—understeer coefficient at 0.15 g (H-P3); Handling performance—understeer coefficient at 0.25 g (H-RTAC); Static rollover threshold (SRT); Load transfer ratio (LTR); Rearward Amplification (RA); Lateral friction utilization (LFU); Friction demand (FD); Low-speed off-tracking (LSOT); High-speed off-tracking (HSOT); Transient off-tracking (TOT).

The simulation results are summarized in Table 2.

The handling performance of the loaded truck/pony trailer was improved with roll coupling. The degree of oversteer occurring at high lateral accelerations was reduced and the transition from understeer to oversteer occurred at a higher lateral acceleration when roll coupling was present. The handling performance was essentially the same for both the non roll coupled and roll coupled trailers in combination with an empty truck. However the roll coupled trailer exhibited less understeer and therefore has slightly improved handling characteristics.

Stability was improved under both loading conditions with roll coupling, enabling the static rollover performance standard of 0.35 g to be achieved when coupled with a loaded truck.

Roll coupling resulted in an improvement dynamic performance for all dynamic performance measures (that is, LTR, RA, and TOT as defined below). The use of roll coupling allowed all the dynamic performance standards to be achieved under both loading conditions. Of particular note is the significant improvement in load transfer ratio in the order of 28% under both loading conditions.

The low-speed performance was largely unaffected by roll coupling. However this configuration exhibited high levels of friction demand (FD) with and without roll coupling, particularly when the truck was unloaded. This implies that only a loaded truck should be used to haul a loaded trailer under low traction conditions. Even with a loaded truck care should be taken when negotiating tight turns.

The high-speed off tracking performance standard (<0.46 m) was achieved for both coupling methods when hauled by an empty truck. The standard was not achieved for either coupling method when hauled by a loaded truck, but performance was marginally better with a roll coupled trailer.

Understeer Coefficients (USC) were used to evaluate handling performance at steady-state conditions by calculating the understeer coefficient at 0.15 g, 0.30 g, (TAC 0.25 g). This measure is expressed in degrees per g which represents the slope of the handling diagram. Positive and negative values indicate understeer and oversteer levels respectively. This performance measure is determined during a ramp steer manoeuvre (ramp steer rate of 2 deg/sec at steering wheel) at a forward velocity of 100 km/h. The pass/fail criterion is

TABLE 2

Simulation Results

| | | Tandem truck/Tridem pony trailer | | | |
|---|---|---|---|---|---|
| Performance Measures | Performance Standard | Non-roll coupled Loaded Truck | Non-roll coupled Empty Truck | Roll coupled Loaded Truck | Roll coupled Empty Truck |
| Handling performance (point #1) Oversteer transition | >0.20 g's | 0.209 | 0.373 | 0217 | 0.318 |
| Handling performance (point #2) USC at 0.3 g | >4.45 deg/g | −4.081 | 0.671 | −3.175 | 0.339 |
| Handling performance (point #3) USC at 0.15 g | >0.50, <2.00 deg/g | 0.961 | 2.627 | 1.515 | 2.049 |
| Handling performance (RTAC) USC at 0.25 g | >4.45 deg/g | −2.171 | 2.530 | −1.159 | 1.439 |
| Static rollover threshold | >0.35 g's | 0.348 | 0.410 | 0.372 | 0.513 |
| Load transfer ratio | <0.60 | 0.725 | 0.709 | 0.524 | 0.510 |
| Rearward amplification | <2.00 | 1.992 | 2.011 | 1.728 | 1.841 |
| Low-speed lateral Friction utilization (low friction) | <0.80 | 0.457 | 0.362 | 0.532 | 0.396 |
| Friction demand | <0.10 | 0.185 | 0.441 | 0.191 | 0.424 |
| Low-speed offtracking | <5.60 m | 2.483 | 2.341 | 2.591 | 2.468 |
| High-speed offtracking | <0.46 m | 0.559 | 0.330 | 0.495 | 0.374 |
| Transient offtracking | <0.80 m | 0.571 | 0.518 | 0.492 | 0.423 |
| Load Height - truck (m) | | 4.15 | 2 | 4.15 | 2 |
| Load Height - trailer (m) | | 4.15 | 4.15 | 4.15 | 4.15 |
| Steering axle load (kg) | | 9 100 | 5 665 | 9 100 | 5 665 |
| Drive Group load (kg) | | 17 000 | 8 030 | 17 000 | 8 030 |
| Trailer load (kg) | | 21 000 | 21 000 | 24 000 | 24 000 |
| Gross Combination Weight (kg) | | 47 100 | 34 695 | 50 100 | 37 695 | addressed by comparing the understeer coefficient with the critical understeer coefficient, which can be expressed as $-Lg/U2$, where U is the vehicle speed (U=27.77 m/s (100 km/h)), L is the tractor or truck wheelbase (in meters), and g is acceleration due to gravity (9.81 m/s$^2$). If the value of the understeer coefficient is greater than the critical value, the vehicle will meet the criterion (TAC performance standard). In addition the lateral acceleration where the transition from understeer to oversteer (that is, the point where the understeer coefficient is zero) is also computed.

Static Rollover Threshold (SRT) is the level of steady lateral acceleration beyond which the configuration rolls over. The measure is expressed as the lateral acceleration (in g's) at which all wheels on one side, except the steer axle, lift off the ground. Configuration performance is considered satisfactory if the static rollover threshold is greater than or equal to 0.35 g.

Load Transfer Ratio (LTR) is defined as the ratio of the absolute value of the difference between the sum of the right wheel loads and the sum of the left wheel loads, to the sum of all the wheel loads. The front steering axle is excluded from the calculations because of its relatively high roll compliance. Configuration performance is considered satisfactory if the LTR is less than or equal to 0.60 (TAC performance standard). This performance measure is evaluated during a rapid lane change manoeuvre conducted at 88 km/h, yielding a lateral acceleration amplitude of 0.15 g and a period of 2.5 seconds at the tractor's steering axle.

Rearward Amplification (RWA) is defined as the ratio of the peak lateral acceleration at the mass centre of the rearmost trailer to that developed at the mass centre of the tractor. Configuration performance is considered satisfactory if the RWA is less than or equal to 2.0, which is the current TAC performance standard. This performance measure was evaluated in the same manoeuvre as LTR.

Friction Demand (FD) performance measure describes the non tractive tire friction levels required at the drive axles of a tractor. Excessive friction demand is a contributing factor to jackknife and also results in excessive tire wear. Friction demand is the absolute value of the ratio of the resultant sheer force acting at the drive tires divided by the cosine of the tractor/trailer articulation angle to the vertical load on the drive tires. Configuration performance is considered satisfactory if FD is less than or equal to 0.1 (TAC performance standard). This performance measure is evaluated in a 90-degree turn at a vehicle speed of 8.25 km/h. During the manoeuvre, the centre of the front steer axle tracks an arc with a 12.8-m radius (approximately a 14-m outside-wheel-path radius).

Lateral Friction Utilization (LFU) is a measure proposed by NRC to characterize the highest level of the lateral friction utilization at the steering axle. LFU is defined as the ratio of the sum of lateral forces to the vertical load, and the peak tire/road coefficient of adhesion. The tires of a steering axle that achieves a lateral friction utilization level of 1 are said to be saturated. Configuration performance is considered satisfactory if LFU is less than or equal to 0.80 (NRC recommended performance standard). Initially this performance measure was evaluated on a high friction surface. This measure was modified by evaluating LFU on low friction surfaces, which are more critical for steering performance, by using low friction tire characteristics ($\mu$=0.2). This performance measure was evaluated using the same manoeuvre as FD.

Low Speed Off tracking (LSOT) was measured as the maximum lateral displacement of the centre-line of the last axle of the configuration from the path taken by the centre of the steer axle. Configuration performance is considered satisfactory if LSOT is less than or equal to 5.6 m (TAC performance standard). This performance measure was evaluated using the same manoeuvre as FD and LFU.

High Speed Steady State Off tracking (HSOT) was measured as the maximum lateral displacement of the centre-line of the last axle of the configuration from the path taken by the centre of the steer axle. Configuration performance is considered satisfactory if HSOT is less than or equal to 0.46 m (TAC performance standard). This value represents a minimal clearance of 0.15 m between the trailer tires and the outside of a 3.66-m wide conventional traffic lane. This performance measure was evaluated when the vehicle is operated in a 393-m curve radius, at a speed of 100 km/h, thereby attaining a steady lateral acceleration level of 0.2 g.

Transient Off tracking (TOT) was measured as the maximum lateral displacement of the centre-line of the last axle of the configuration from the path taken by the centre of the steer axle. Configuration performance is considered satisfactory if TOT is less than or equal to 0.8 m (TAC performance standard). This performance measure was evaluated in the same manoeuvre as LTR and RWA.

SUMMARY OF THE INVENTION

In summary, the roll coupling assembly according to the present invention for roll coupling the drawbar of a trailer to the rear of a tow vehicle, may be characterized in one aspect as including:
  a) a roll torque transfer structure including at least one first load bearing surface on a first load bearing structure mountable to the rear of the tow vehicle and adapted to be mounted closely adjacent thereto, and at least one second load bearing surface on a second load bearing structure mountable to the front of the trailer drawbar, wherein the first and second load bearing surfaces cooperate so as to releasably mate with one another for towing of the trailer behind the tow vehicle and, when the trailer is so mated to the tow vehicle, are distributed across a substantially planar interface, which may be vertical, between the rear of the tow vehicle and the front of the trailer drawbar so as to distribute torque imparted to the drawbar by relative rolling motion between the trailer and tow vehicle to the rear of the tow vehicle by distribution of resulting moments which are transferred to the tow vehicle so that the cumulative combined roll resistance of the tow vehicle and trailer resist the rolling of the trailer about the drawbar, and
  b) a coupling alignment mechanism to adjust the relative orientation of the first and second load bearing surfaces in the substantially planar interface so as to align the first and second load bearing surfaces for the mating with one another.

Advantageously, the coupling alignment mechanism includes at least one self-aligning guide cooperating between the first and second load bearing structures so as to urge relative alignment about a roll axis of the drawbar of the first and second load bearing surfaces as the rear of the tow vehicle and the front of the drawbar are urged together so as to urge the first and second load bearing surfaces to the mate with one another.

Further advantageously, the first and second load bearing surfaces mate at at least two spaced apart load transfer points on the substantially planar interface. Advantageously the first and second load bearing structures are mounted at each of the at least two spaced apart load transfer points. At least one self-aligning guide may be mounted at at least one of the two spaced apart load transfer points.

Typically the first and second load bearing structures include male and female load bearing structures. Further, each self-aligning guide may include at least one substantially v-shaped guide for guiding the male load bearing structure into mating engagement in the female load bearing structure. Each v-shaped guide may include a spaced apart pair of substantially v-shaped guides, where the pair of substantially v-shaped guides may be substantially parallel and wherein each guide may include a pair of arms forming the v-shape, and where the arms may extend substantially orthogonally from the substantially planar interface.

In one embodiment, the male load bearing structure includes a hook and the female load bearing structure includes a collar having an aperture sized for snug mating with the hook so as to journal the hook in the aperture. The book may include a pintle book and the collar may include a lunette ring.

In preferred embodiments the spaced apart load transfer points form a substantially linear array. The array may be vertical, horizontal or otherwise aligned in the substantially planar interface.

In further embodiments the coupling alignment mechanism may include a selectively rotatable coupler, selectively rotatable about the roll axis of the trailer drawbar, and mounted between the front of the drawbar and the rear of the tow vehicle. Further, the selectively rotatable coupler may advantageously include a selectively releasable lock. The lock locks the coupler in a fixed roll coupling position, fixed relative to rotation about the roll axis. In a preferred embodiment the coupler and the lock are mounted on the front end of the drawbar.

BRIEF DESCRIPTION OF THE DRAWINGS

In the following figures, similar characters of reference denote corresponding parts in each view.

FIG. 2 is, in perspective view, the roll coupling assembly of FIG. 1.

FIG. 2a is, in partially cutaway perspective view, the roll coupling assembly of FIG. 2 in its open position.

FIG. 2b is a view of FIG. 2a with the roll coupling assembly in its closed position.

FIG. 3 is, in perspective view, the roll coupling assembly of FIG. 2 mounted to a trailer drawbar.

FIG. 4a is, in perspective view, the roll coupling assembly of FIG. 3 with the roll coupling assembly mounted together and the drawbar pivoted upwardly.

FIG. 4b is the view of FIG. 4a with the drawbar lowered to the horizontal.

FIG. 4c is the view of FIG. 4b with the drawbar lowered below horizontal.

FIG. 23b is an enlarged partially cut-away perspective view of the coupling assembly between the pintle hitches and drawbar of FIG. 23a.

DETAILED DESCRIPTION OF EMBODIMENTS OF THE INVENTION

Figure 1:
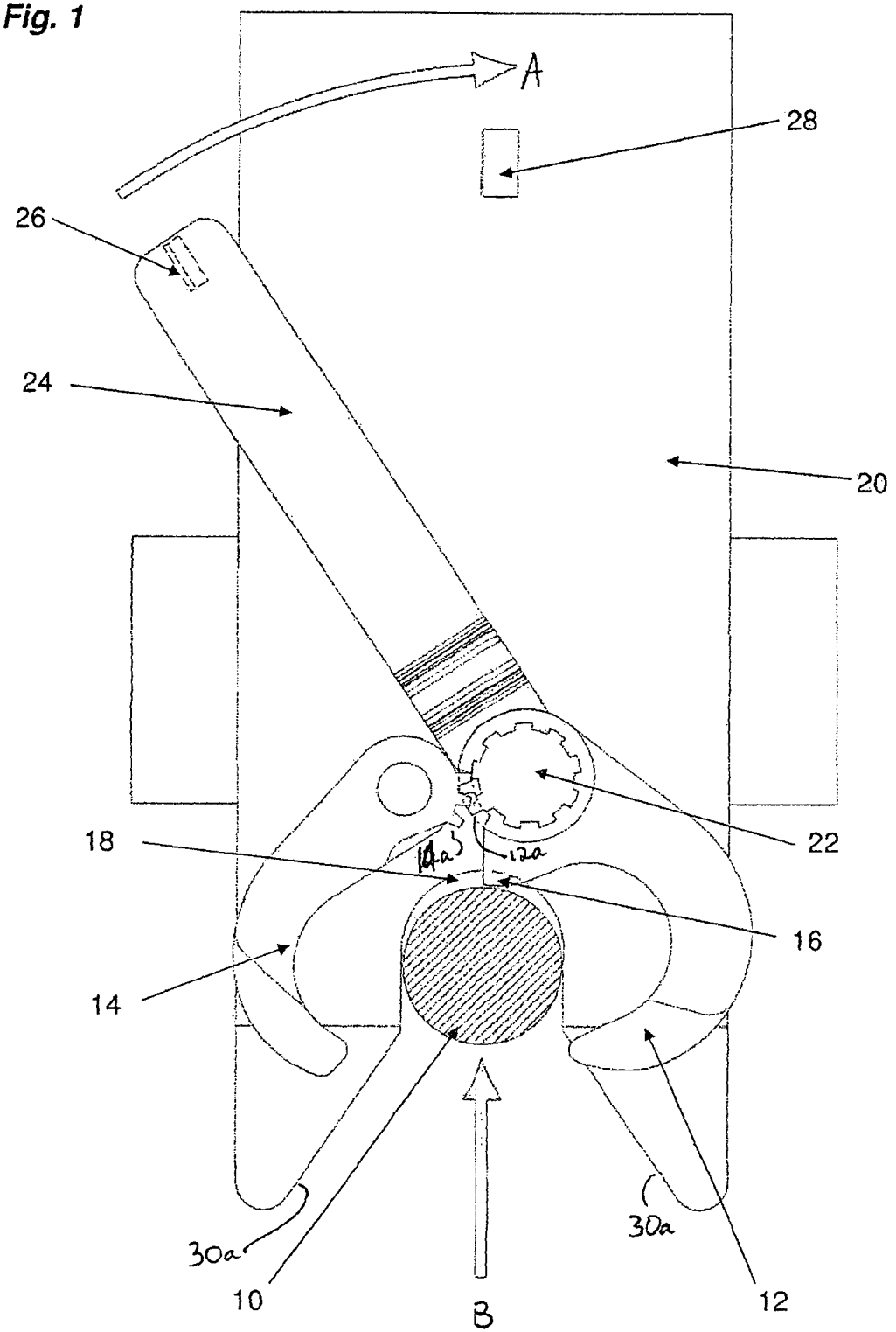
FIG. 1 is, a partially cutaway plan view of a first embodiment of the roll coupling assembly according to the present invention.

FIGS. 1 to 4 illustrate a roll coupling hitch assembly which includes a coupler that engages with a vertical pin to allow yaw and pitch rotation while providing roll coupling to resist rolling about a horizontal longitudinal axis of the trailer (not shown). FIG. 1 illustrates a top view of king pin 10 in the process of engaging with a primary jaw 12 having spur gear teeth 12a that engage with teeth 14a on a secondary jaw 14 to transmit motion as the king pin forces the primary jaw lever 16 rearward until the king pin comes to rest at the rear of the guide slot 18 in the coupler housing 20. As the primary jaw rotates clockwise around pin 22 under pressure from the king pin, as would be the case when a tow vehicle backs into the trailer drawbar 38, the handle 24 rotates clockwise direction A to cause the latch 26 below the handle as best seen in FIG. 2 to engage with a dog 28 formed in the top surface of housing 20. This inhibits the coupler from inadvertently disengaging.

FIGS. 2a and 2b illustrate the jaw assemblies when they are open as shown in FIG. 2a and closed as shown in FIG. 2b. FIG. 2 shows the jaw assembly installed in the housing 20. The housing side plates are not shown in FIG. 2. Housing 20 includes upper and lower guide plates 30 having v-shaped entryways 30a to self-align the coupler with kingpin 10 as the kingpin engages in the entryways during connecting in direction B the tow vehicle and trailer. Entryways 30a provide self-aligning guides which allow coupling of the trailer to the tow vehicle on uneven ground where, otherwise, the male and female coupling structures would not readily align without for example jacking-up the trailer on the low side. It is understood that although not shown illustrated on all embodiments herein, it is intended that self-aligning guides be provided on all embodiments where for example substantially v-shaped guides may be aligned and positioned to guide lunette rings or pins onto their corresponding pintle hooks or collars respectively.

Rolling relative movement is resisted between the vehicle units when the coupler is engaged with king pin 10. Kingpin 10 is fixed on its opposite ends to a bracket 32 that attaches in the illustrated embodiment to the tow vehicle although this is not intended to be limiting as it is intended to be within the scope of the present invention in this and the other embodiments taught herein that if it is taught that the pin is on the trailer and the receiving coupler on the tow vehicle, that the opposite arrangement is also included, for example, that the kingpin or pins be on the trailer drawbar and the receiver on the frame of the tow vehicle.

The lower platform 34 of bracket 32 is larger than the top plate to support the weight of the trailer drawbar 38 and facilitate yaw rotation when the combination tow vehicle and trailer turns a corner.

FIG. 3 illustrates the housing 20 with the side plates attached. The side plates anchor the pitch rotation pins 36 on both sides of the housing. The trailer drawbar 38 is pivotally attached to the housing via pitch pins 36 so that, as seen in FIGS. 4a, 4b and 4c drawbar 38 may pitch relative to the tow vehicle in a range of motion C around the pitch pin 36 axis. The jaws are engaged with, and rotate around, the king pin 10 in bracket 32 to provide yaw rotation of the drawbar relative to the tow vehicle.

FIGS. 5 to 8 illustrate a second embodiment of roll coupling assembly according to the present invention. The coupler is attached to the tow vehicle as better described below instead of to the trailer. This embodiment is particularly suitable for trucks that have an exposed frame section at the rear of the vehicle such as logging trucks. As with the embodiment of FIGS. 1 to 4, and other embodiments taught herein, again advantageously the coupling assembly is closely adjacent the rear of the tow vehicle so as to reduce interference at the back of the tow vehicle. For example, in the first embodiment, if the tow vehicle is a dump truck then interference with a load being dumped from the truck box is minimized, that is, the load doesn't directly pour on to the coupler.

The truck frame rails 40 are attached to a rear cross member 42 that is used to hold the hitch bracket 44 in place. The hitch bracket may be attached directly to the cross member or alternatively it may be cushioned with rubber blocks 46 to absorb shock and permit limited movement to avoid stressing hitch components when operating in rough terrain. However it is attached, the bracket provides upper and lower guide plates 30 again with v-shaped guides 30a to self-align the coupler with the king pin 10 when the tow vehicle is being connected to the trailer and to resist relative rolling movement about longitudinal axis D between the tow vehicle and trailer. Someone skilled in the art would know of many different ways to lock the trailer king pin(s) 10 within the neck 30b of guide plates 30 without restricting yaw movement. In this embodiment two jaws 48 are provided in locking devise 50. Locking device 50 holds the jaws open or closed. When open the jaws do not obstruct guides 30a or neck 30b. As seen in FIG. 5b the forward end of the trailer drawbar 38 has kingpin 10 mounted vertically thereon. Kingpin 10 runs vertically through a metal block 52 that also houses the pitch pin 36 to provide pitch rotation of the drawbar about the pitch pin axis.

Figure 5A:
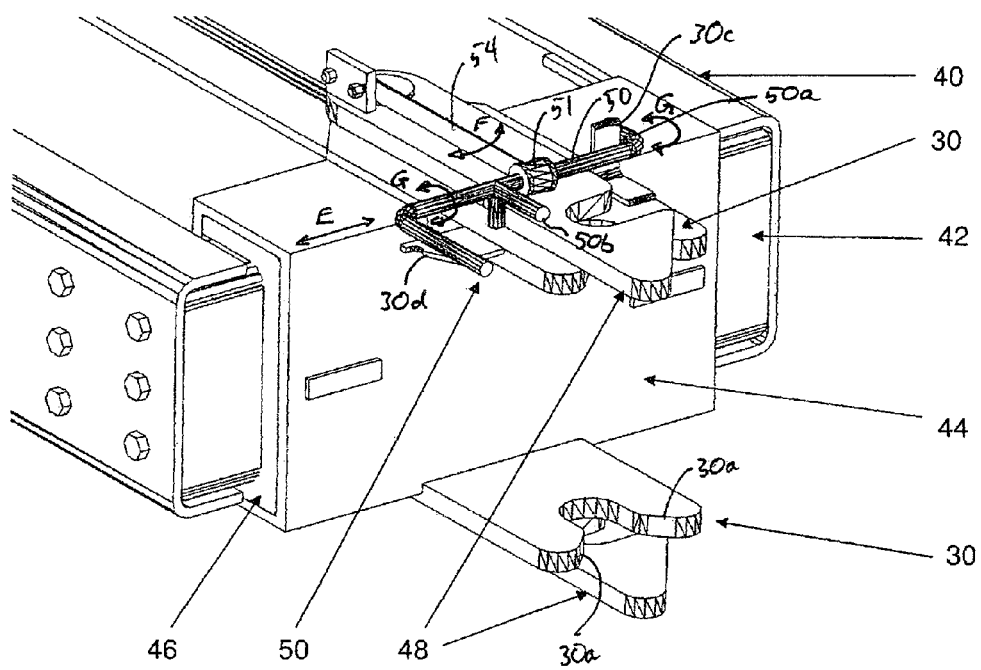
FIG. 5a is, in perspective view, the female load transfer structure according to a second embodiment of the roll coupling assembly according to the present invention mounted on the rear of a tow vehicle frame.
Figure 5B:
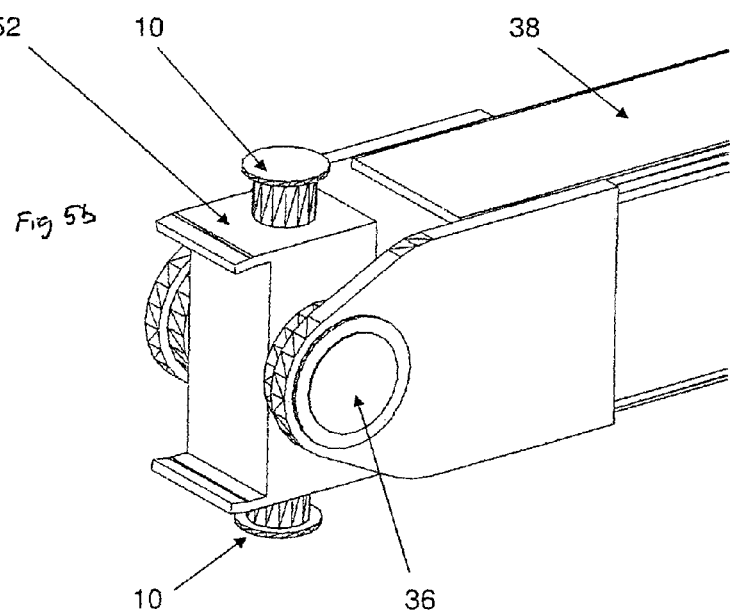
FIG. 5b is, in perspective view, the male load transfer structure of the embodiment of FIG. 5a mounted on the front end of a drawbar.
Figure 6:
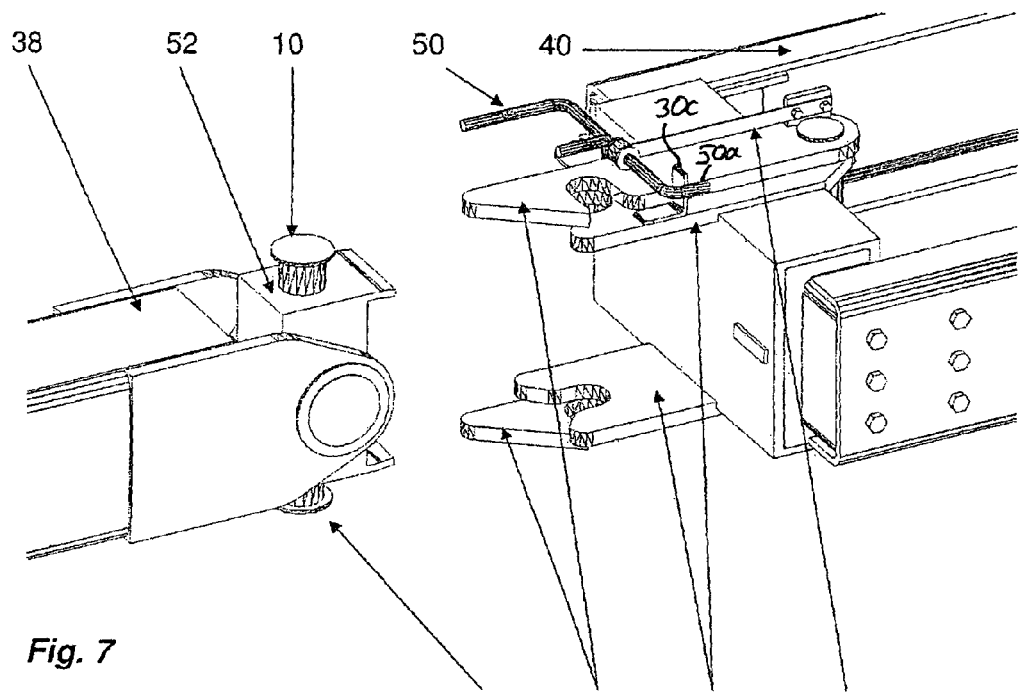
FIG. 6 is, in perspective view looking towards the rear of the tow vehicle, the roll coupling assembly of FIGS. 5a and 5b.
Figure 7:
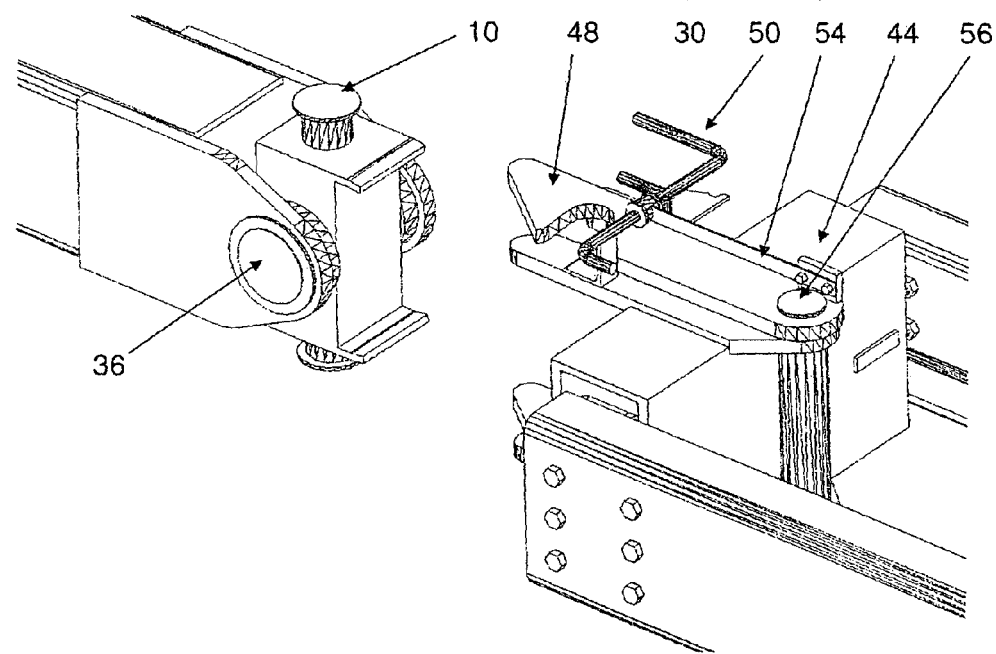
FIG. 7 is the roll coupling assembly of FIG. 6 in perspective view looking at the front of the drawbar.

FIGS. 6 and 7 further illustrate the hitch assembly of FIG. 5. The jaw locking mechanism is shown in both views. The lock handle 50 rotates in direction G within a pin boss 51 attached to the distal end of a leaf spring 54 so as to unhook arm 50a from behind bracket 30c. Spring 54 is attached at its opposite end to the upper jaw 48 by means of bracket 54a. Moving and locking the handle 50 in either direction E deflects the spring in direction F applying spring pressure on to upper jaws 48 to either open or close. Both jaws are rigidly connected via pin 56 so operation of upper jaw 48 simultaneously operates lower jaw 48. The upper jaw 48 is held open by engaging arm 50b within latch 30d by pulling back on, and rotation of handle 50.

Figure 8:
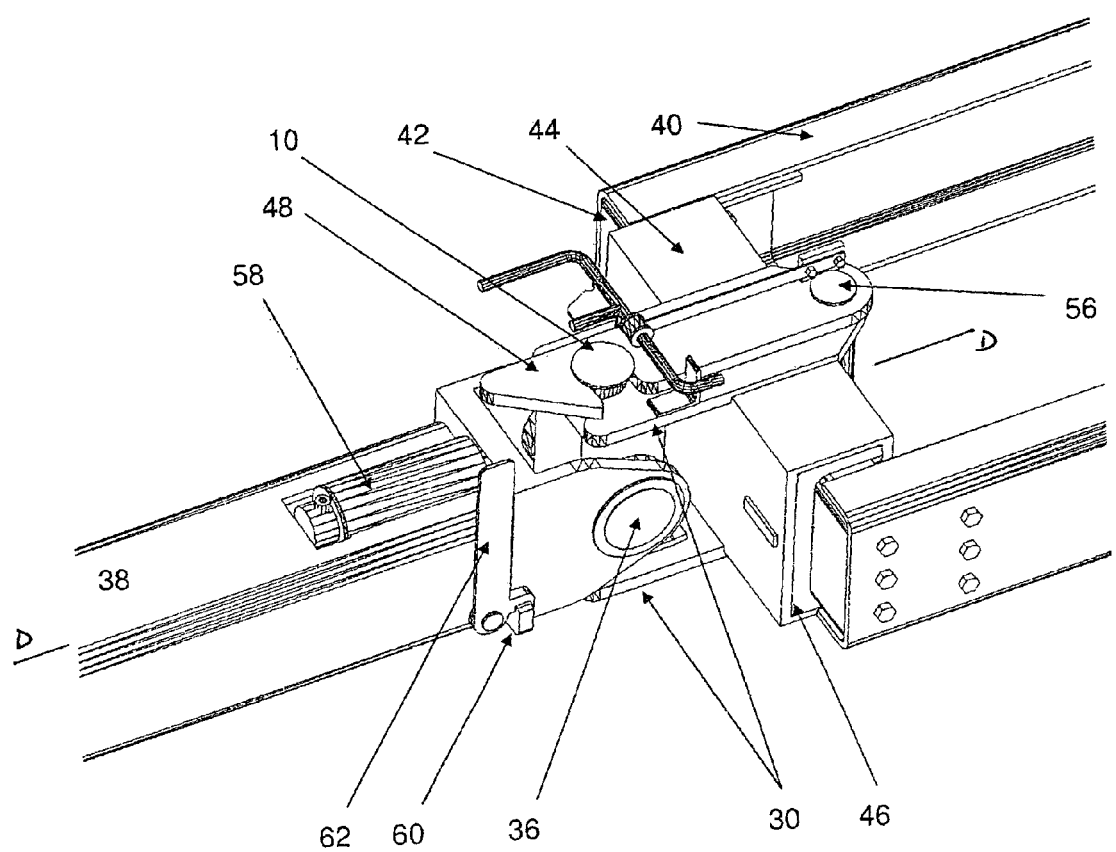
FIG. 8 is a further embodiment of the roll coupling assembly of FIG. 7 wherein the male load transfer structure is selectively rotatable about the roll axis of the drawbar.

FIG. 8 illustrates the trailer drawbar attached to the tow vehicle frame. The drawbar in this embodiment however provides a means of selectively disabling the roll coupling to allow for roll rotation about roll axis (longitudinal axis) D. The drawbar is allowed to roll about roll axis pin 58 when the locking mechanism 60 located on both sides of the drawbar are disengaged by rotating the control handle 62 counter-clockwise. This is useful for an operator where the tow vehicle and trailer are knowingly going to be driven, usually slowly, over rough terrain where if the roll coupler were not de-coupled damage might occur to the coupler, frame of the trailer, and/or frame of the tow vehicle.

The third roll coupling assembly of FIGS. 9 to 12 illustrates how a single hitch assembly may be utilized with safety chains or the like to achieve roll coupling.

FIG. 9 again illustrates the end of a tow vehicle (truck or trailer) frame 40 and a cross member 42. In this embodiment a pintle hook coupling 64 is mountable to the cross member 42. The cross member 42 also has two slotted arms 66 extending therefrom. The trailer drawbar 38 assembly is connected with the tow vehicle by engaging a lunette ring 68 mounted on the drawbar with the pintle coupler 64. A pair of oppositely disposed ears 72a are mounted to the drawbar under the lunette ring. The drawbar ears 72a are attached to the slotted arms 66 using chains 70 and hooks 74. The ears 72a are mounted to the lower part of the drawbar directly below the center of the lunette ring by a swivel bracket 72. Swivel bracket 72 rotates in direction H about pin 72b when the tow-vehicle turns a corner. The lower ends of the chains are mounted to the ears. The upper ends of the chains are attached to hooks 74. Hooks 74 engage in slots 66a in slotted arms 66 as the drawbar lunette ring is being lowered over the hook 64a of the pintle coupler 64 while the trailer is being connected to the tow vehicle.

Figure 9:
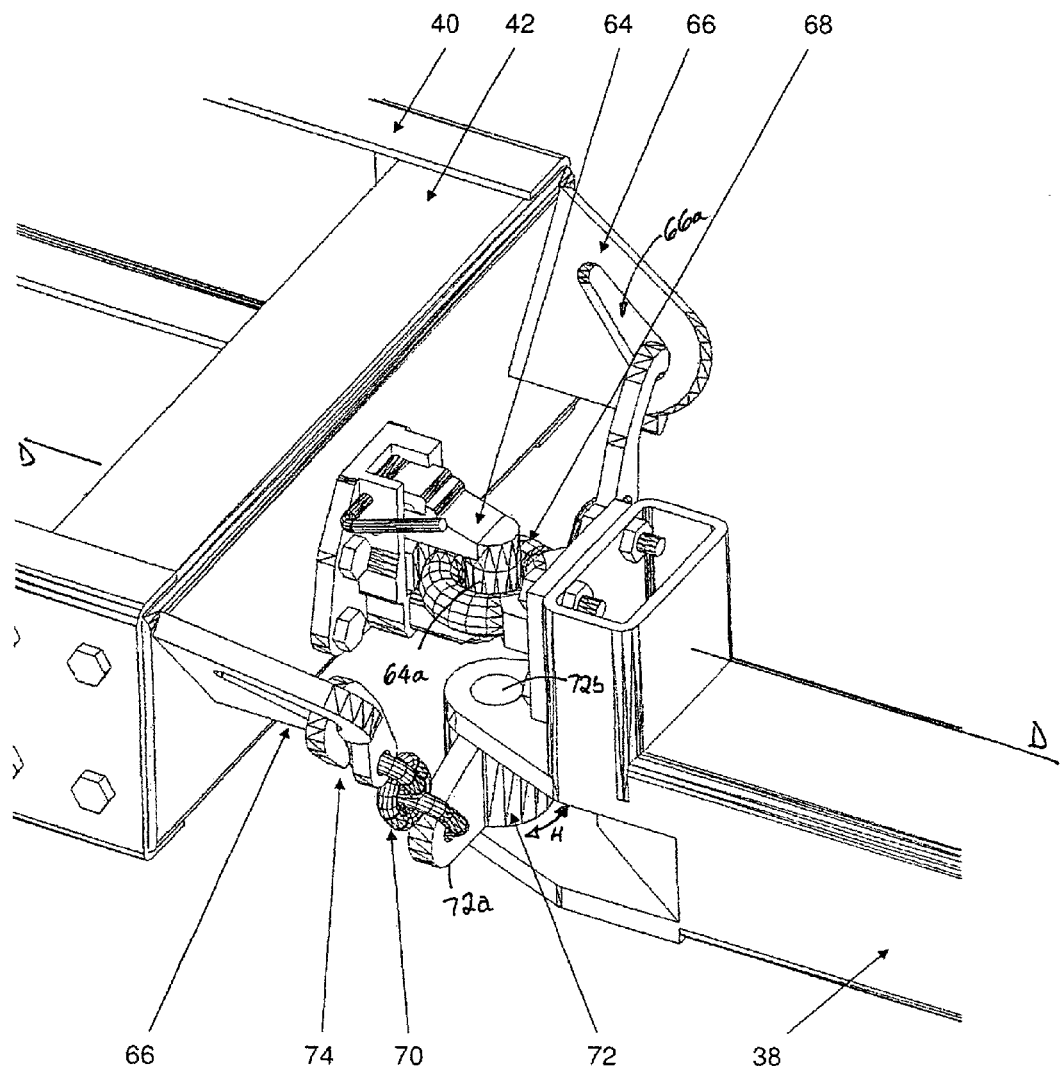
FIG. 9 is, in perspective view, a further embodiment of the roll coupling assembly according to the present invention.
Figure 10:
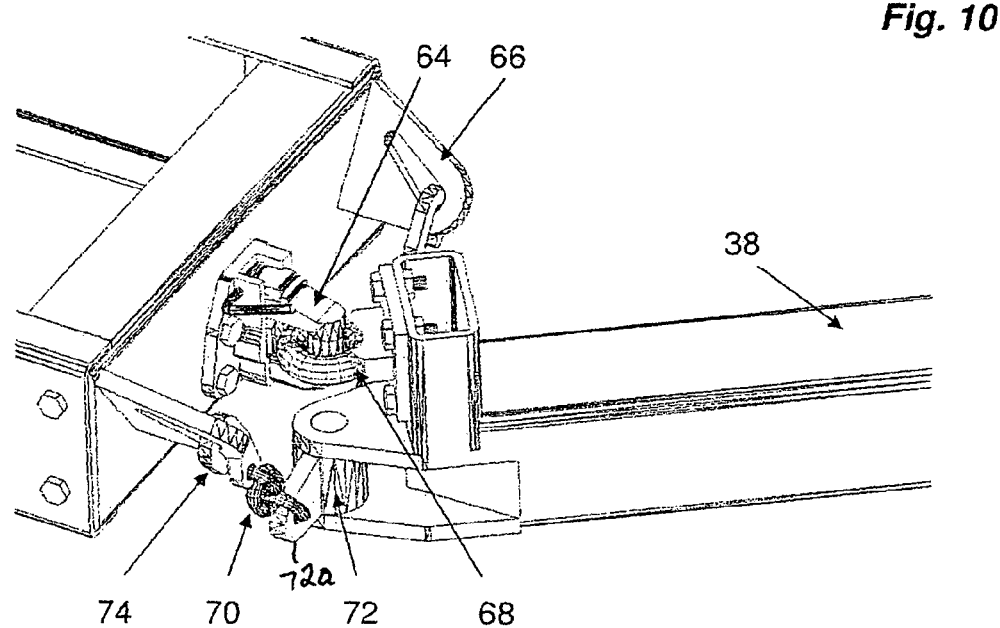
FIG. 10 is, in perspective view, the roll coupling assembly of FIG. 9 with the drawbar rotated in a horizontal plane.

FIG. 10 illustrates the components of FIG. 9 as they would appear when the tow vehicle and trailer are making a turn. The chain swivel bracket 72 has rotated in direction H within a slot (not shown) on the lower forward end of drawbar 38. The rotation of bracket 72 avoids stressing chains 70 and hooks 74.

The chains 70 illustrated in FIGS. 9 and 10 are of sufficiently short length so as to be tight to thereby resist roll movement about axis D between the tow vehicle and trailer. These chains can alternatively be attached directly to the drawbar on trailers operating in jurisdictions where more roll movement is permitted by law.

Figure 11:
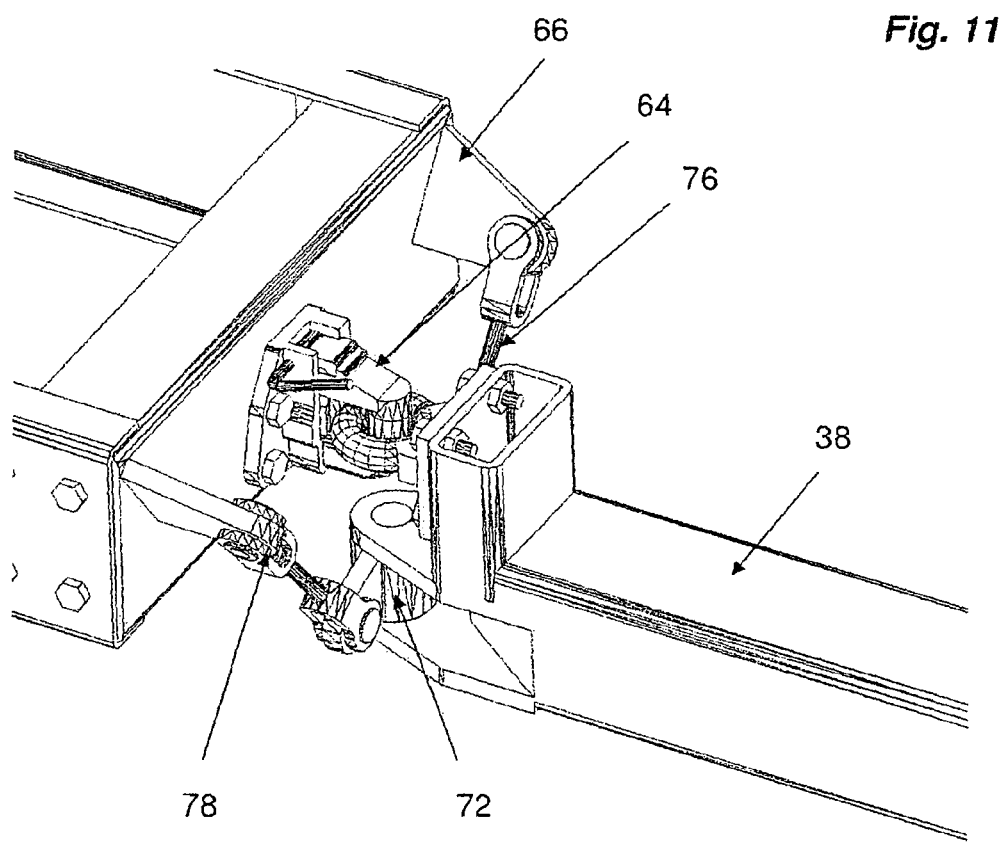
FIG. 11 is, in perspective view, a further alternative embodiment of the roll coupling assembly of FIG. 9.
Figure 12:
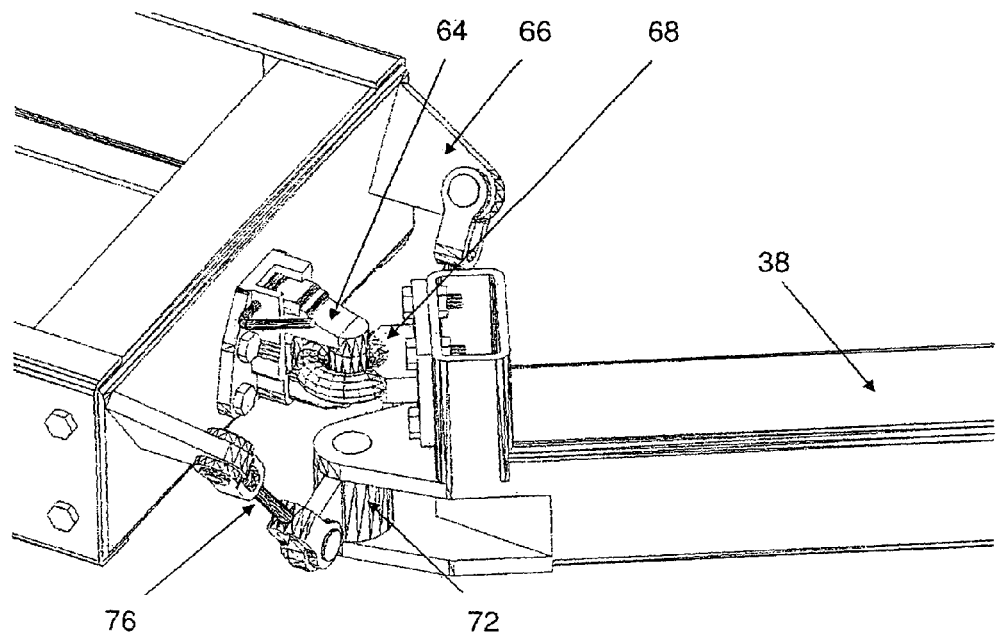
FIG. 12 is, in perspective view, the roll coupling assembly of FIG. 11 with the drawbar rotated in a horizontal plane.

FIG. 11 illustrates an alternative arrangement substituting link rods 76 for chains 70. Link rods 76 are pinned to arms 66 and swivel bracket 72 using adjustable yokes 78. FIG. 12 illustrates the alternative arrangement of FIG. 11 as it would appear when the tow vehicle is making a turn. Again swivel bracket 72 has rotated relative to the lower forward end of drawbar 38 to avoid stressing the link rods 76.

The roll coupling embodiments of FIGS. 13 to 19 provide two or more vertically aligned hitches to reduce the amount of trailer weight loaded on each hitch and to resist horizontal shear forces acting on the hitches resulting from roll coupling the trailer to the tow vehicle.

Figure 13:
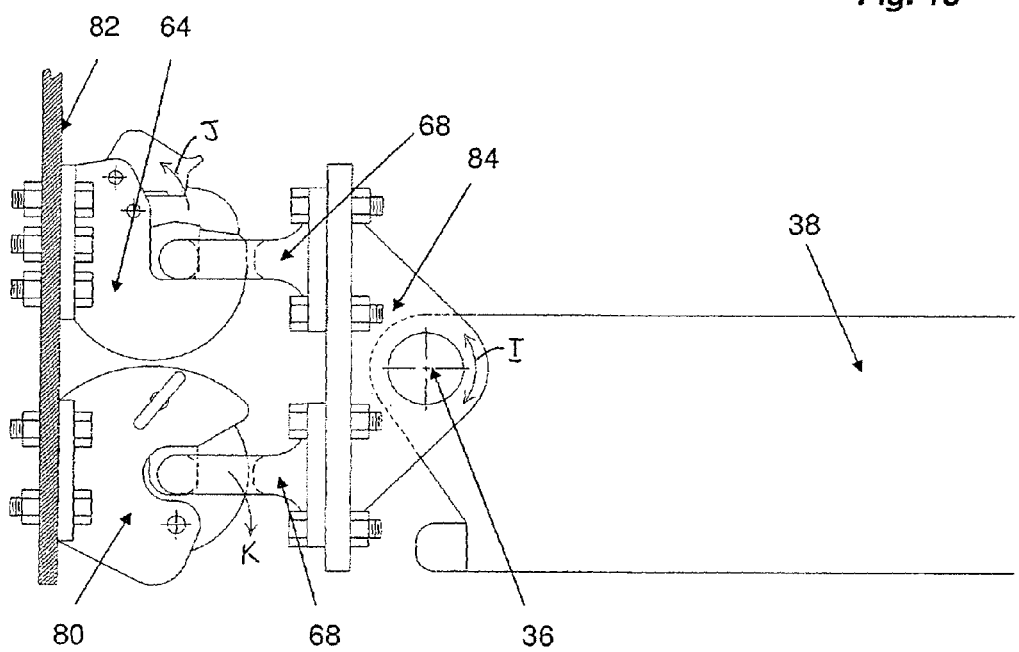
FIG. 13 is, in left side elevation view, a further embodiment of the roll coupling assembly according to the present invention.

FIG. 13 illustrates, as an example, a vertically aligned combination of a pintle hook 64 and a drop-pintle coupling 80 mounted to a truck towing apron 82. Lunette rings 68 are mounted on trailer drawbar 38 by pitch plate 84. Pitch plate 84 is pivotally mounted on the end of drawbar 38 providing pitch rotation in direction I around pitch pin 36. Lunette rings 68 mount into hook 64 and coupling 80. Hook 64 is opened by lifting the closing arm 64b in direction J. Coupling 80 is opened by unlatching and dropping hook 80a in direction K.

Figure 14:
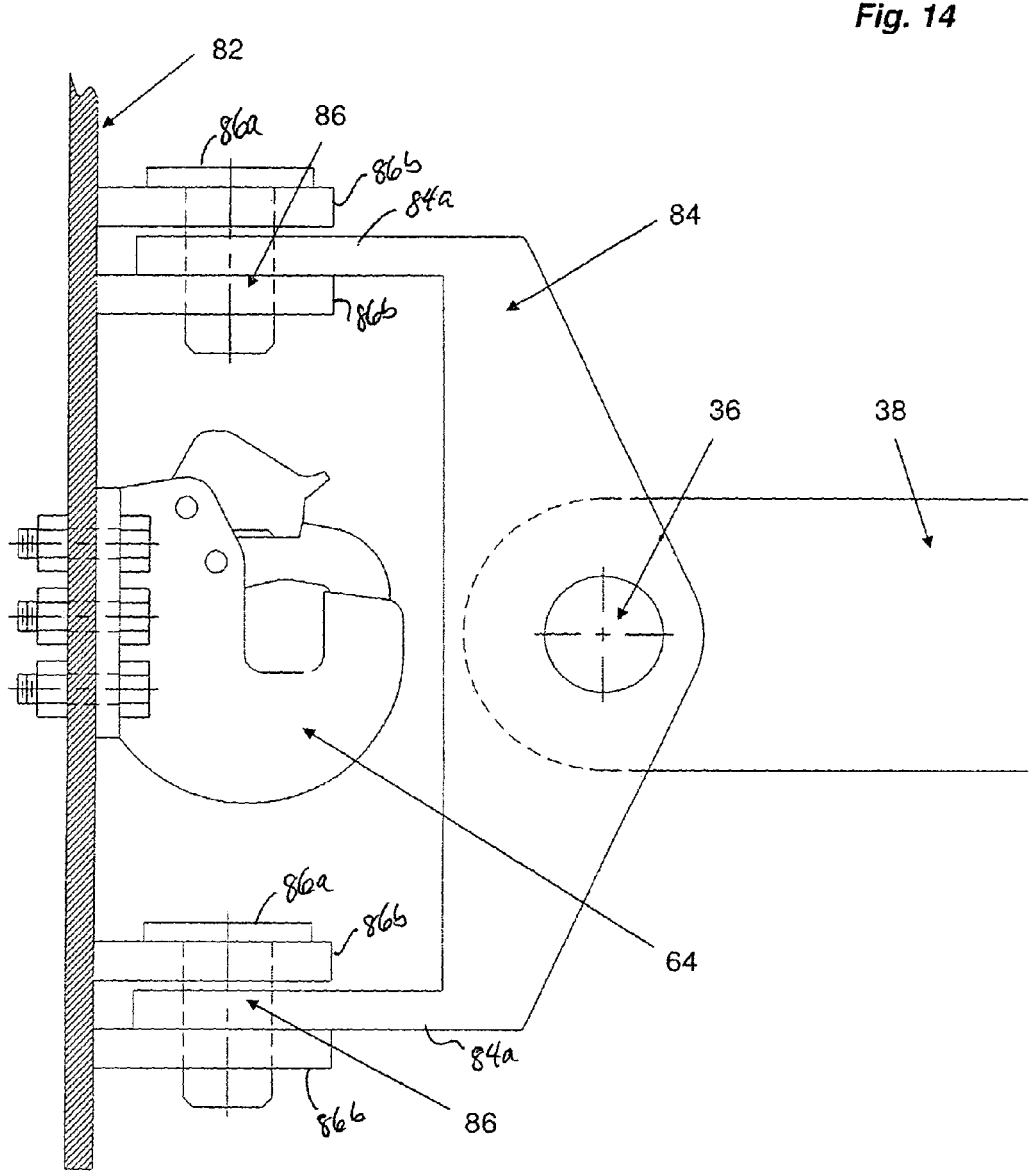
FIG. 14 is, in left side elevation view, yet a further embodiment of the roll coupling assembly according to the present invention.

FIG. 14 illustrates how another vertically aligned hitch arrangement may be used to employ two pinned couplers 86 above and below a pintle coupler 64 attached to towing apron 82 such as would be found on a dump truck equipped for towing a tandem axle pony trailer. Pins 86a are journalled downwardly through vertically aligned eyes in collars 86b and through a corresponding eye in each arm 84a on pitch plate 84 interleaved between each pair of collars 86b. Pitch plate 84 is pinned at 36 to allow pitch motion.

Figure 15:
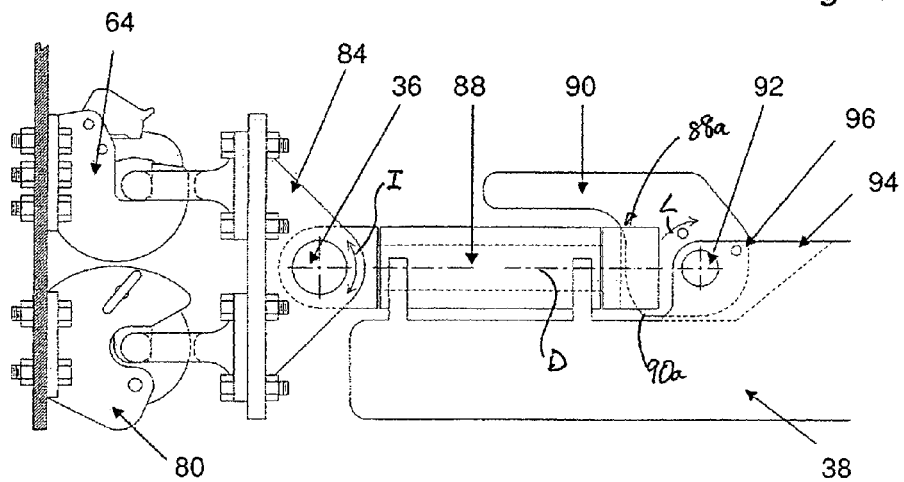
FIG. 15 is, in left side elevation view, the roll coupling assembly of FIG. 13 adapted to provide selective roll rotation of the coupling assembly relative to the drawbar.

FIG. 15 illustrates a combination of a pintle hook 64 and a drop-pintle coupling 80 connected to a trailer drawbar 38 via pitch plate 84 that is pinned by pitch pin 36 to a longitudinal roll axis pin 88. Pin 88 may be locked to prevent roll motion or released to allow for roll motion about axis D to selectively provide roll coupling when desired by an operator, for example when travelling on a highway. In the example of a lock for pin 88, a roll lockout handle 90 rotates vertically in direction L around a pin 92 passing through the lockout handle 90 and trailer drawbar bracket 94 to disengage the locking flange 90a of lockout handle 90 from a slot 88a in the end of the roll axis pin 88 for off-road use of the tow vehicle and trailer. A safety pin 96 may be inserted through the lockout handle bracket 94 attached to the trailer drawbar 38 and lockout handle 90 to hold the lockout handle in either its open or closed position.

A proximity sensor or electric switch (such as sensor 38a) in FIG. 15 should be provided to activate a warning device in the cab of the tow vehicle so as to alert the operator that the roll coupling lock has not been engaged.

Figure 16:
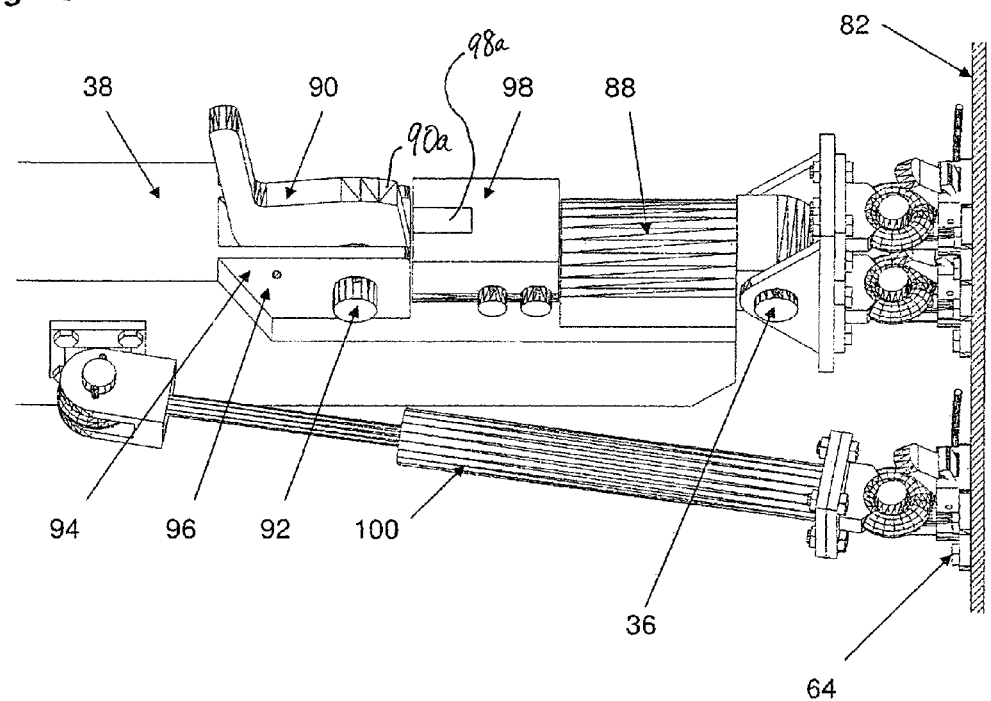
FIG. 16 is, in perspective view, a further embodiment of a roll coupling assembly according to the present invention.

In FIG. 15 the roll lockout handle 90 is illustrated in the locked position. In FIG. 16 the handle 90 is illustrated disengaged from slot 98a in a roll swivel pin assembly 98 mounted on roll axis pin 88 to provide unrestricted roll movement when operating the vehicle off road on rough and uneven terrain.

FIG. 16 illustrates the roll coupling assembly of FIG. 15 with the addition of a yaw dampening cylinder 100 pivotally attached to drawbar 38 and connected to a second pintle coupler 64 attached to tow apron 82 laterally offset from the first pintle coupler 64 and coupling 80 so as to control rearward amplified sway around the yaw axis on combination vehicles having multiple trailers such as those known conventionally as "A" trains and triples.

Figure 17:
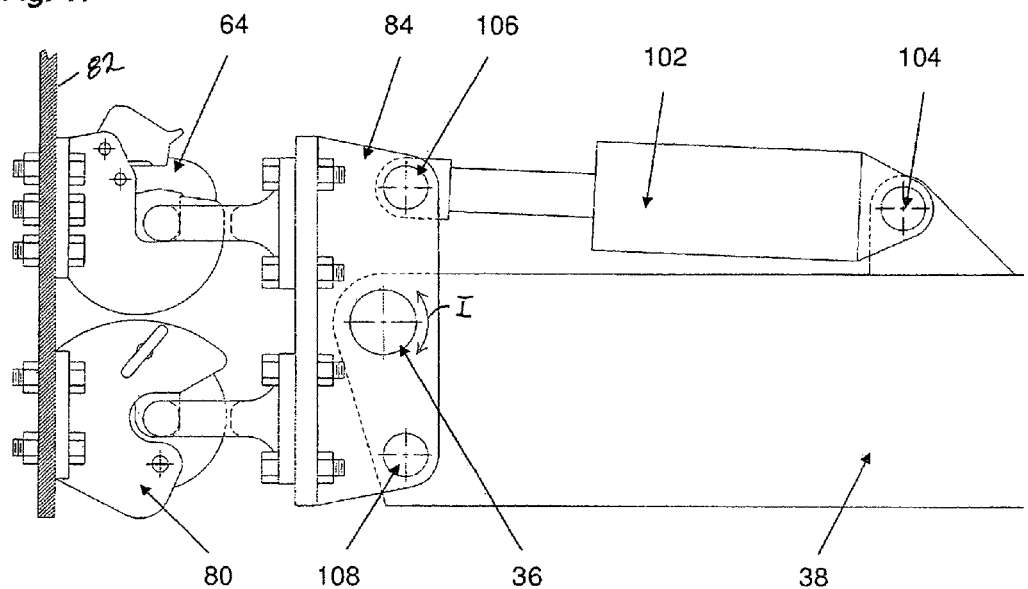
FIG. 17 is a variant of the roll coupling assembly of FIG. 13 illustrated in left side elevation view.

There are concerns in the trucking industry regarding the loss of steering tire friction on tri-drive trucks when the frame is loaded aft of the driving axles. FIG. 17 illustrates a fluid cylinder such as pneumatic cylinder 102 that is pivotally anchored to the trailer drawbar 38 by pin 104. The cylinder 102 is pivotally connected to the pitch plate bracket 84 by pin 106 to apply forward pressure on the upper coupler 64 when the cylinder is sufficiently charged to transfer weight forward of the driving axle group to the steering axle of the tow vehicle such as the steering axle of a tri-drive truck.

On occasion it may be necessary to move a trailer with a tow vehicle that is not equipped for roll coupling. A pin 108 may be inserted through an aperture in the pitch plate bracket 84 and through trailer drawbar 38 to prevent pitch rotation around pitch pin 36 when the trailer is attached to a tow vehicle that is equipped with only one coupler.

Figure 18:
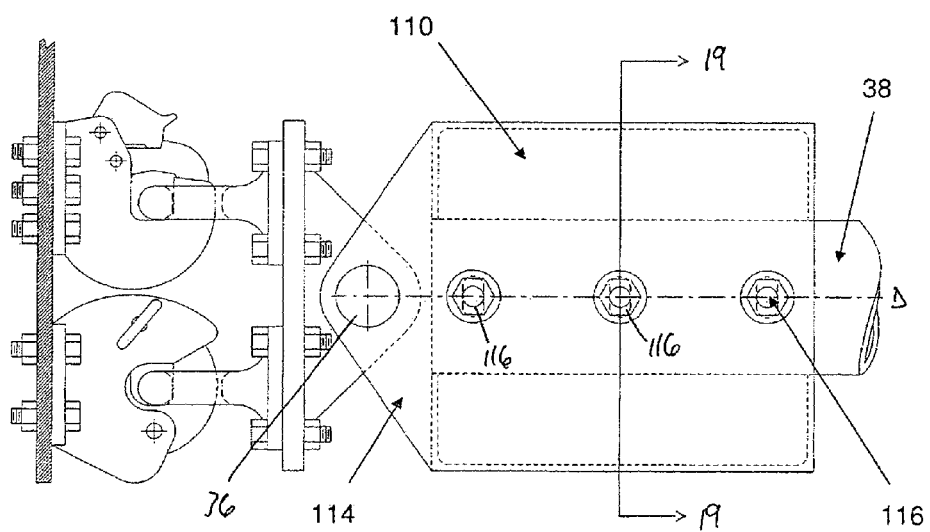
FIG. 18 is a further variant of the roll coupling assembly of FIG. 13 illustrated in left side elevation view.
Figure 19:
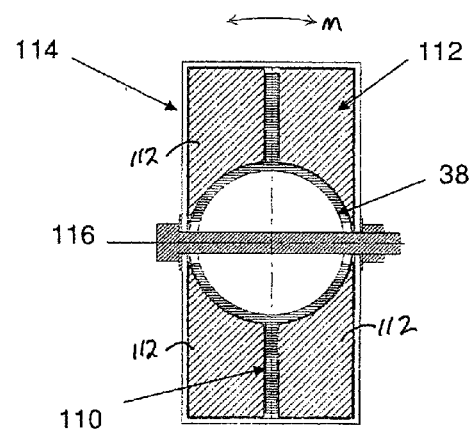
FIG. 19 is a cross sectional view along line 19-19 in FIG. 18.

FIG. 18 illustrates a means of cushioning torsional shock and restricting roll rotation on torsionally rigid trailers the drawbar 38 has two vertical plates 110 attached at the upper and lower quadrants of the round tube of the drawbar 38 to apply pressure on the four rubber blocks 112 contained inside the shock dampening roll housing 114 as better seen in the sectional view of FIG. 19 when rotational movement occurs around the roll axis D in the center of the drawbar tube 38. The four rubber blocks 112 are provided to cushion and resist roll rotation in direction M of the drawbar assembly 38 within the confines of the roll housing 114. The housing assembly is held in place using three or more mounting bolts 116 passing through slotted holes in the drawbar 38 to prevent excessive roll rotation. It is understood that a variety of methods for reducing torsional shock and strain may be employed by someone skilled in the art and that cushioning the mounting bracket on the tow vehicle could alternatively provide similar torsional stress relief.

The coupling embodiments of FIGS. 20 to 26 illustrate how two or more horizontally aligned hitches may be used to achieve the roll coupling according to the present invention.

Figure 20:
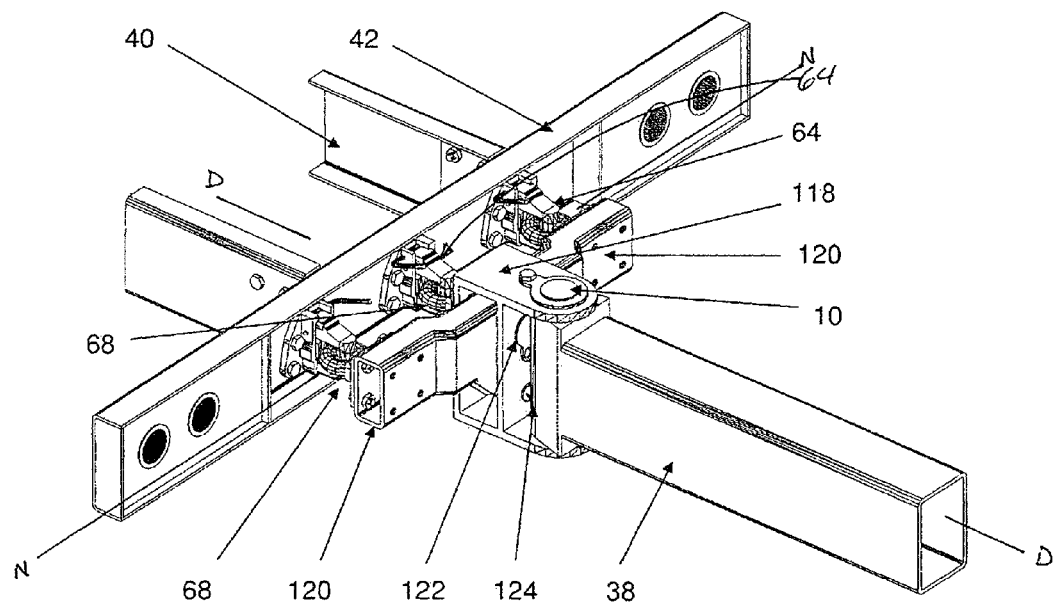
FIG. 20 is, in perspective view, a further embodiment of a roll coupling assembly according to the present invention.

FIG. 20 illustrates three pintle hook couplers 64 mounted to the end of a truck or trailer frame 40 and in particular to cross member 42. The center pintle hook mounts to the centre lunette ring 68. The centre lunette ring 68 is mounted to housing 118. Beam 120 is mounted to housing 118 by roll axis pin 122 for rotation about axis D. Pin 124 is mounted through corresponding apertures in housing 118 and beam 120 to prevent roll rotation about pin 122. Pin 124 may be removed to allow roll rotation. The beam 120 has a laterally spaced apart pair of lunette rings 68 attached to the front of each end of beam 120 to engage with the corresponding pintle couplers 64 attached laterally spaced apart to the tow vehicle. The three horizontally aligned pintle couplers 64 allow pitch rotation about axis N. The trailer drawbar 38 is pivotally connected to the housing 118 by kingpin 10 to provide yaw rotation around kingpin 10.

Figure 21:
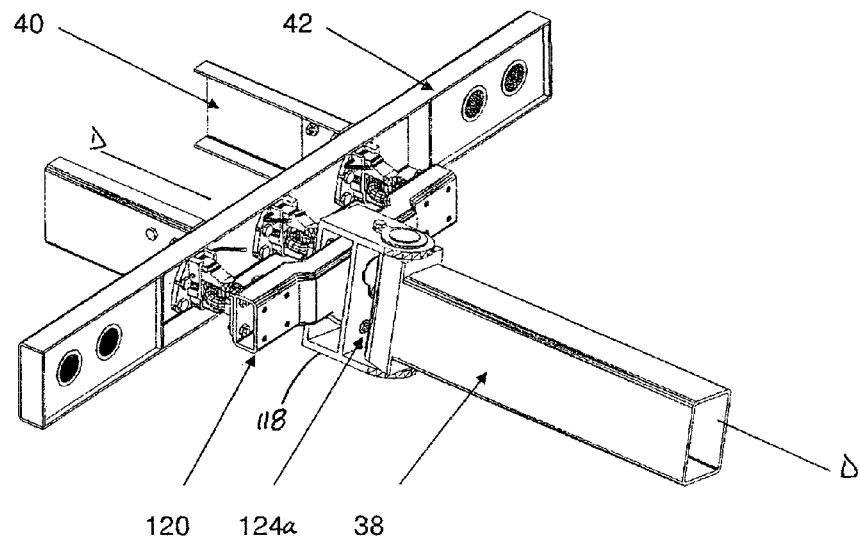
FIG. 21 is, in perspective view, the roll coupling assembly of FIG. 20 with the drawbar rolled about the drawbar roll axis.
Figure 22:
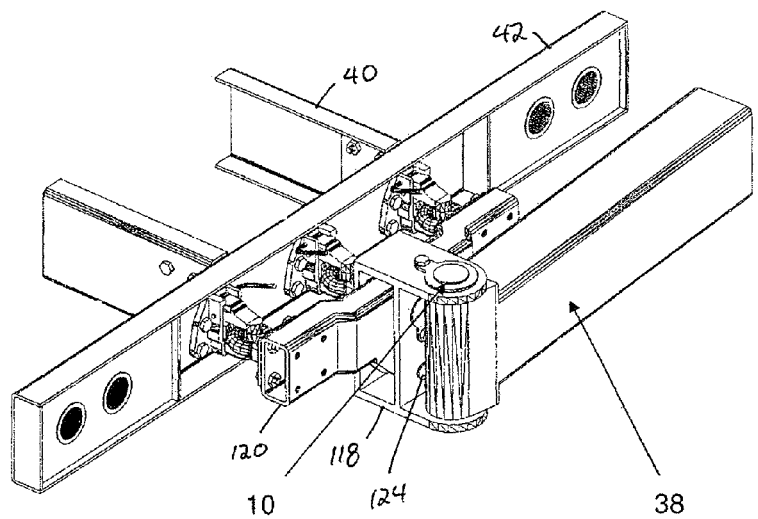
FIG. 22 is, in perspective view, the roll coupling assembly of FIG. 20, with the drawbar rotated in a horizontal plane.

FIG. 21 illustrates the components of FIG. 20 as they would appear with pin 124 removed from its aperture 124a in housing 118 and the drawbar 38 rolled to the right about axis D. FIG. 22 illustrates those same components with pin 124 replaced as they would appear when the tow vehicle and trailer are making a very sharp right turn or the tow vehicle is backing up and jack-knifing the trailer to the right so as to rotate the drawbar about the kingpin.

Figure 23A:
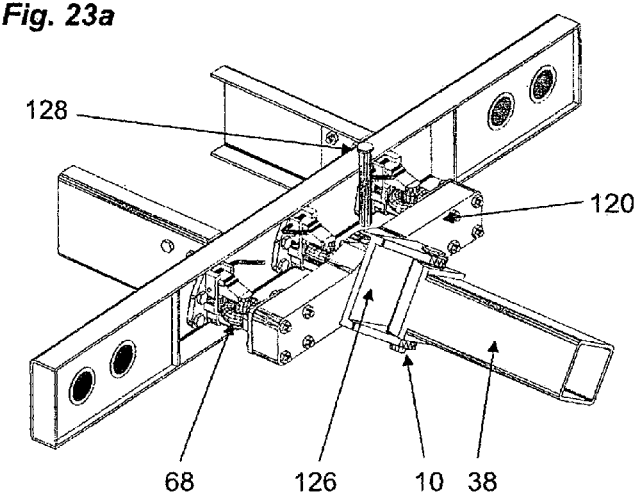
FIG. 23a is, in perspective view, a variant of the roll coupling assembly of FIG. 20.
Figure 23B:
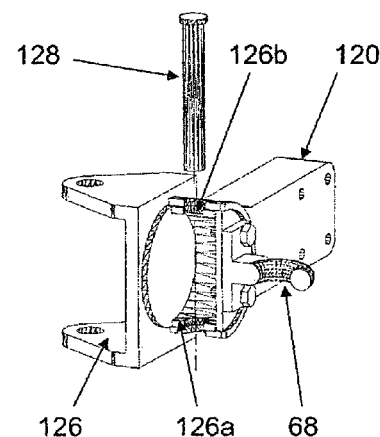

FIG. 23a illustrates a further alternative embodiment. A shaft 126a (shown in FIG. 23b) runs along axis D through beam 120. The centre lunette ring 68 is mounted to the front of shaft 126a and yoke 126 is mounted to the rear end. Yoke 126 is thus pivotally mounted to beam 120 for rotation around axis D and pivotally mounted to drawbar 38 by kingpin 10 to provide yaw rotation around kingpin 10. A pin such as 128 may be journalled through aperture 126b when aligned with a corresponding aperture in beam 120 so that pin 128 is inserted through both apertures when yoke 126 is vertical so as to selectively lock yoke 126 to prevent roll rotation and thus provide roll coupling. As is the case with other embodiments, the hitch assembly may be symmetrical as shown for example in FIG. 23a or asymmetric (that is extending only to one side of axis D) as illustrated in FIG. 23b

FIG. 23 illustrates a further alternative embodiment. A shaft 126a (shown in dotted outline) runs along axis D through beam 120. The centre lunette ring 68 is mounted to the front end of shaft 126a and yoke 126 is mounted at the rear end. Yoke 126 is thus pivotally mounted to beam 120 for rotation about axis D and pivotally mounted to drawbar 38 by kingpin 10 to provide yaw rotation around king pin 10. A pin such as pin 124 may be journalled through aperture 128 when aligned with a corresponding aperture (not shown) in beam 120 so that pin 124 is inserted through both apertures when yoke 126 is vertical so as to selectively lock yoke 126 to prevent roll rotation and thus to provide roll coupling.

Figure 24:
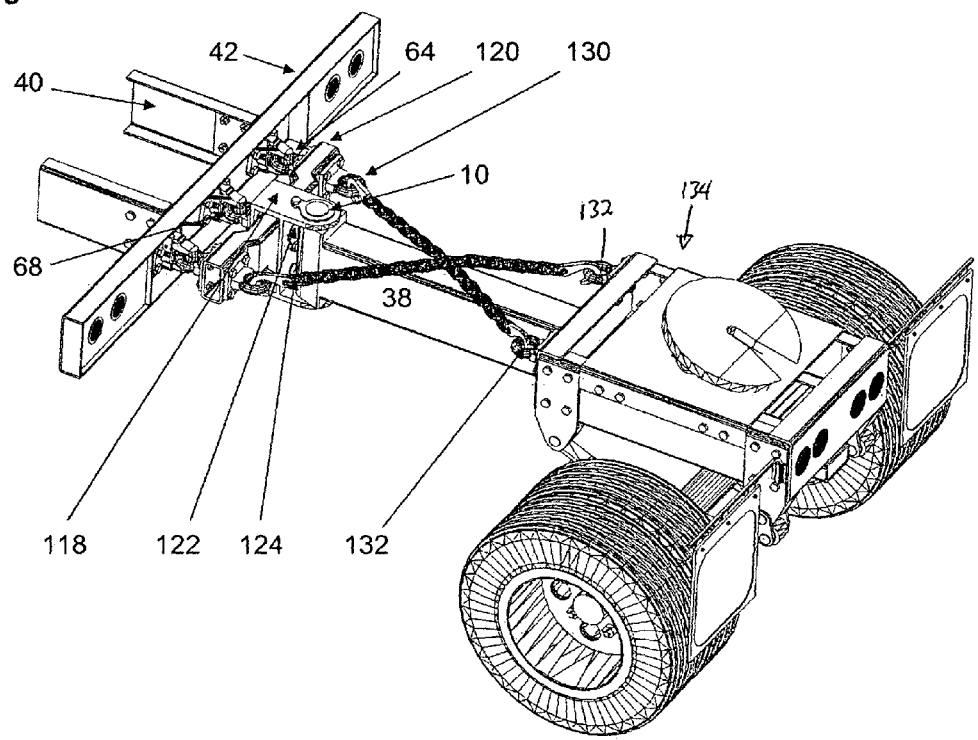
FIG. 24 is, in perspective view, the roll coupling assembly of FIG. 20 mounted to a dolly.
Figure 25:
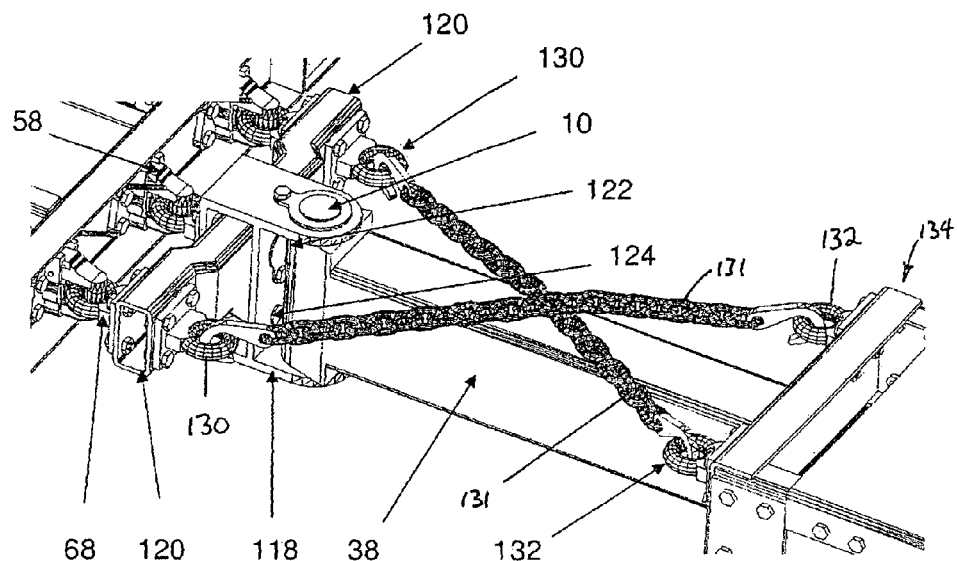
FIG. 25 is an enlarged view of a portion of FIG. 24.
Figure 26:
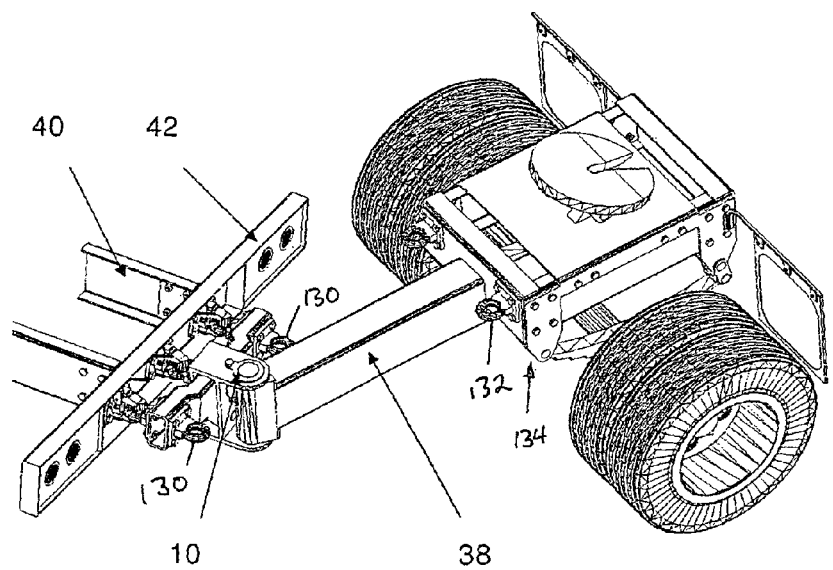
FIG. 26 is, in perspective view, the roll coupling assembly and dolly of FIG. 24 with the drawbar and dolly rotated in a horizontal plane.

FIGS. 24 to 26 illustrate how horizontally aligned hitches may be used to roll couple an "A" train dolly.

FIGS. 24 and 25 illustrate the roll coupling assembly of FIG. 20 mounted to the rear end of a tow vehicle (truck or trailer) frame 40 on cross member 42. A second pair of lunette rings 130 are mounted laterally spaced apart to the back of beam 120. Yaw rotation about kingpin 10 may be selectively prevented by attaching a pair of criss-crossed chains 131 or other elongate mechanical bracing means diagonally between lunette rings 130 and a third pair of lunette rings 132 mounted on the dolly frame 134. The chains are removed when it is desired to travel and provide for yaw rotation about kingpin 10 as seen in FIG. 26.

As will be apparent to those skilled in the art in the light of the foregoing disclosure, many alterations and modifications are possible in the practice of this invention without departing from the spirit or scope thereof. Accordingly, the scope of the invention is to be construed in accordance with the substance defined by the following claims.

What is claimed is:

1. A roll coupling assembly for roll coupling the drawbar of a trailer to the rear of a tow vehicle, the assembly comprising:

a roll torque transfer structure including at least one first load bearing surface on a first load bearing structure mountable to the rear of the tow vehicle and adapted to be mounted closely adjacent thereto, and at least one second load bearing surface on a second load bearing structure mountable to the front of the trailer drawbar, wherein said first and second load bearing surfaces cooperate so as to releasably mate with one another for towing of the trailer behind the tow vehicle and, when the trailer is so mated to the tow vehicle, are distributed across a substantially planar interface between the rear of the tow vehicle and the front of the trailer drawbar so as to distribute torque imparted to the drawbar by relative rolling motion between the trailer and tow vehicle to the rear of the tow vehicle by distribution of resulting moments which are transferred to the tow vehicle so that the cumulative combined roll resistance of the tow vehicle and trailer resist the rolling of the trailer about the drawbar, a coupling alignment mechanism to adjust the relative orientation of said first and second load bearing surfaces in said substantially planar interface so as to align said first and second load bearing surfaces for said mating with one another, wherein said coupling alignment mechanism includes at least one self-aligning guide cooperating between said first and second load bearing structures so as to urge relative alignment about a roll axis of the drawbar of said first and second load bearing surfaces as the rear of the tow vehicle and the front of the drawbar are urged together so as to urge said first and second load bearing surfaces to said mate with one another, wherein said first and second load bearing surfaces mate at least two spaced apart load transfer points on said substantially planar interface, and wherein said at least one self-aligning guide is mounted at least one of said at least two spaced apart load transfer points.

2. The assembly of claim 1 wherein said first and second load bearing structures include male and female load bearing structures, and wherein said at least one self-aligning guide includes at least one substantially v-shaped guide for guiding said male load bearing structure of said first and second load bearing structures into mating engagement in said female load bearing structure of said first and second load bearing structures.

3. The assembly of claim 2 wherein said at least one substantially v-shaped guide includes a spaced apart pair of substantially v-shaped guides.

4. The assembly of claim 3 wherein said pair of substantially v-shaped guides are substantially parallel and wherein each guide of said substantially v-shaped guides includes a pair of arms forming said v-shape, and wherein said arms extend substantially orthogonally from said substantially planar interface.

5. The assembly of claim 4 wherein said substantially planar interface is substantially vertical.

6. The assembly of claim 5 wherein said male load bearing, structure includes a hook and wherein said female load bearing structure includes a collar having an aperture sized for snug mating with said hook so as to journal said hook in said aperture.

7. The assembly of claim 5 wherein said hook includes a pintle hook and wherein said collar includes a lunette ring.

8. The assembly of claim 7 wherein said first and second load bearing structures are mounted at each of said at least two spaced apart load transfer points.

9. The assembly of claim 8 wherein said at least two spaced apart load transfer points form a substantially linear array.

10. The assembly of claim 9 wherein said array is substantially vertical.

11. The assembly of claim 10 wherein said array is substantially horizontal.

12. The assembly of claim 2 wherein said male and female load bearing structures are mounted at each of said at least two spaced apart load transfer points.

13. The assembly of claim 12 wherein said male load bearing structure includes a hook and wherein said female load bearing structure includes a collar having an aperture sized for snug mating with said hook so as to journal said hook in said aperture.

14. The assembly of claim 1 wherein said coupling alignment mechanism includes a selectively rotatable coupler, selectively rotatable about the roll axis of the trailer drawbar, mounted between the front of the drawbar and the rear of the tow vehicle.

15. The assembly of claim 14 wherein said selectively rotatable coupler includes a selectively releasable lock, wherein said lock locks said coupler in a fixed roll coupling position, fixed relative to rotation about said roll axis.

16. The assembly of claim 15 wherein said coupler and said lock are mounted on the front end of the drawbar.

17. The assembly of claim 1 wherein said coupling alignment mechanism includes a selectively rotatable coupler, selectively rotatable about the roll axis of the trailer drawbar, mounted between the front of the drawbar and the rear of the tow vehicle.

18. The assembly of claim 17 wherein said selectively rotatable coupler includes a selectively releasable lock, wherein said lock locks said coupler in a fixed roll coupling position, fixed relative to rotation about said roll axis.

* * * * *